United States Patent
Varga et al.

(10) Patent No.: US 9,245,214 B2
(45) Date of Patent: Jan. 26, 2016

(54) IMAGE PROCESSING COMPRESSION WITH A DEFINED PIXEL WINDOW IN A LINEAR ARRAY

(71) Applicants: John T. Varga, Longmont, CO (US); Walter F. Kailey, Broomfield, CO (US); Vincent W. Ferreri, Federal Heights, CO (US)

(72) Inventors: John T. Varga, Longmont, CO (US); Walter F. Kailey, Broomfield, CO (US); Vincent W. Ferreri, Federal Heights, CO (US)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 14/318,382

(22) Filed: Jun. 27, 2014

(65) Prior Publication Data

US 2015/0379383 A1    Dec. 31, 2015

(51) Int. Cl.
*H04N 1/46*    (2006.01)
*G06K 15/02*    (2006.01)

(52) U.S. Cl.
CPC ................... *G06K 15/1872* (2013.01)

(58) Field of Classification Search
None
See application file for complete search history.

(56) References Cited

U.S. PATENT DOCUMENTS

| | | | |
|---|---|---|---|
| 7,062,100 B2* | 6/2006 | Ebner et al. | 382/243 |
| 7,403,661 B2 | 7/2008 | Curry et al. | |
| 7,657,112 B2 | 2/2010 | Kuwabara | |
| 8,417,064 B2* | 4/2013 | Wakazono et al. | 382/298 |
| 8,755,619 B2* | 6/2014 | Choi et al. | 382/245 |
| 2010/0310168 A1 | 12/2010 | Kass et al. | |
| 2011/0158523 A1* | 6/2011 | Yamada | 382/166 |
| 2013/0272617 A1 | 10/2013 | Conger | |

FOREIGN PATENT DOCUMENTS

JP    2010-206599    9/2010

OTHER PUBLICATIONS

Glasbey, C.A. & Horgan, G.W., "Image Analysis For The biological Sciences", Chapter 3: Filters, pp. 1-46, Jul. 1995.
Dougherty, Geoff—"Digital Image Processing for Medical Applications", Cambridge University Press, Cambridge New York, Chapter 6, pp. 155-193, 2009.
Dougherty, Geoff—"Digital Image Processing for Medical Applications", Cambridge University Press, Cambridge New York, Chapter 6, pp. 155-186, 2009.

* cited by examiner

*Primary Examiner* — Steven Kau
(74) *Attorney, Agent, or Firm* — Blakely, Sokoloff, Taylor & Zafman LLP

(57) ABSTRACT

A method is described that includes defining a window of one or more consecutive pixel values in a linear array of pixel values of an image. The defining includes adding a pixel value in the linear array to the window so long as the pixel value does not deviate from the pixel values that exist within the window to a degree that causes a threshold value to be exceeded, and, wherein the threshold value decreases as the size of the window increases. The method also includes encoding the window of pixel values with a value determined from pixel values within the window and the number of pixel values within the window.

17 Claims, 4 Drawing Sheets

IMAGE PROCESSING COMPRESSION WITH A DEFINED PIXEL WINDOW IN A LINEAR ARRAY

FIELD OF THE INVENTION

The field of invention relates to graphics processing, and, more specifically, to an image processing compression technique.

BACKGROUND

Printers are continuously being designed to improve their performance in many if not all respects. Generally, desirable printer features include the ability to print high quality images at high speed. Printing high quality images generally entails processing high pixel density images. Printing such images at high speed additionally requires processing the high pixel density images at high speed. Processing large amounts of information in short periods of time impose high performance data computation and/or data transportation challenges within a printer that is a challenge for printer designers to suitably address.

FIGURES

A better understanding of the present invention can be obtained from the following detailed description in conjunction with the following drawings, in which.

DETAILED DESCRIPTION

Compression is a traditional mechanism for lessening the burdens associated with processing and/or transporting large amounts of information. Compression essentially reduces the amount of information to be processed/transported without, ideally, losing any or too much of the original information content. In the case of lossy compression schemes, original information is lost, yet, the lost information is not critical to the recipient. In the case of lossy image compression schemes specifically, the image produced by the compression technique remains acceptably viewable to the human eye even though the image differs somewhat from the original image prior to application of the compression technique. A good image compression technique, therefore, is able to remove (potentially) large amounts of original information without sacrificing picture overall quality.

Additionally, given that an objective is to process/transport information in short amounts of time, the compression technique should also be fairly straightforward to execute so that it does not consume large amounts of processing resources (and therefore time and/or energy) to execute. Conceivably, there exist mathematically complex compression techniques that require large amounts of processing resources to execute. A more desirable compression technique would include a mathematically simpler process that, because of its more simplistic formulation, does not require large amounts of processing resources to implement. At the same time, repeating the original point, the produced image quality should not drastically suffer even though the mathematics are not overly complex.

Figure 1:
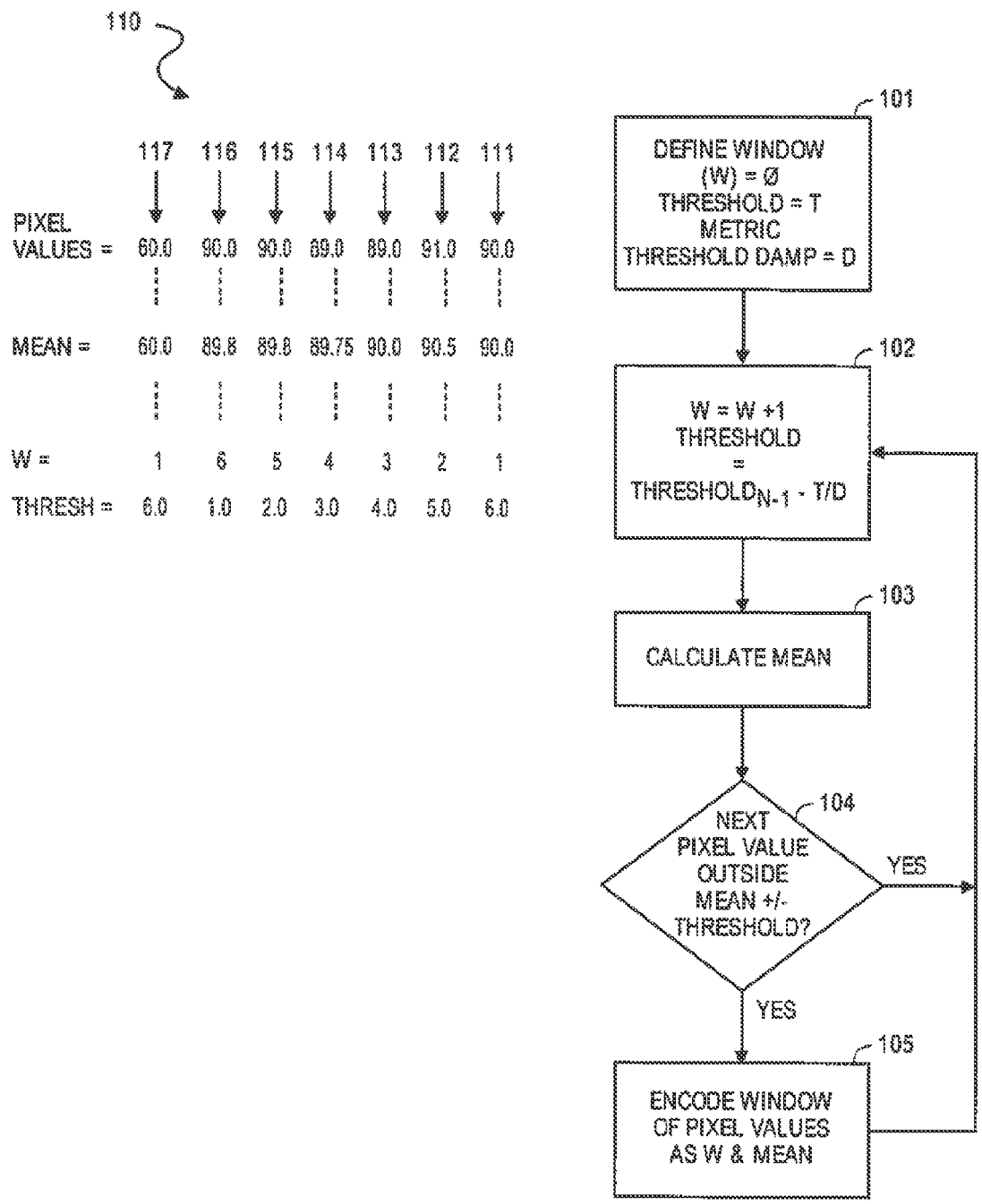
FIG. 1 depicts an exemplary embodiment of an image compression technique.

FIG. 1 pertains to an image compression technique that meets these criteria. As will be made more clear in the following discussion, embodiments of the compression technique can be implemented as a "one-dimensional" process that only process pixels along a particular row or column of an image's pixel array rather than simultaneously processing large numbers of pixels over a wide surface area. Additionally, the compression technique is not overly complex mathematically and therefore can be executed quickly without consuming large amounts of processing resources.

Inset 110 of FIG. 1 shows a segment of exemplary pixel values along a row or column within the pixel array of an overall image that is to be printed. As an example, consider an image in which 8 bits are used to define the value of each pixel, hence, each pixel can take on any value from 0 to 255. Inset 110 shows a segment of a consecutive string of such pixel values. The pixel values themselves are typically for a particular color (e.g., red, green or blue). A set of pixel arrays, each array having its own specific color, when combined, produce the complete image. Each pixel location in the array corresponds to a specific location in the image.

As observed in FIG. 1, it is not uncommon for consecutive pixel values to have approximately the same value. Many images have one or more fields or regions of the image where the color is approximately the same (e.g., a large of patch of blue sky in the background). As such, it is not uncommon when processing images to observe run lengths of neighboring pixels whose values are approximately the same.

A design philosophy of the compression technique of FIG. 1 is that extended run lengths of approximately the same pixel value can be replaced with a much smaller data footprint that simply specifies the number of pixel values in the run length and assigns each of them the same value. Whereas the original data of the data field can be quite large (one unique pixel value for every pixel in the run-length), the compressed version will posses only two values (a number of pixels and the value for each).

Although some dynamic range is lost because neighboring pixel values in such a run length are assigned the same value, as will be made more apparent below, the overall possible dynamic range of colors within the image is not lost because the "same" value assigned to multiple neighboring pixels can theoretically be any one of the 256 possible pixel values (in the case of 8 bit pixels). Moreover, as will be further discussed below, the compression technique, although being mathematically less complex, naturally prevents the creation of super-long run lengths of same pixel values (which would be visible the human eye as a loss of fine detail) and tends to force different pixel values into the image data as a run length of same pixel values becomes longer.

By cutting off extended run lengths of same pixel values, and, e.g., forcing a new run length of a different pixel values, the overall presented image will still be composed of multiple different colors such that the effects of the compression will be less visible to the human eye. In this manner, the compression technique reduces the amount of the data while at the same time does not significantly diminish overall image quality.

As observed in FIG. 1, the compression technique employs the concept of a window where, pixels within a same window will ultimately be assigned the same pixel value consistent with the discussion above.

In an embodiment, the beginning of the compression technique initially defines 101 a window size (W) of zero, a threshold metric (T) of some value and a threshold dampening factor (D). In an implementation, both T and D may be configurable. As will be more clear below, setting a higher threshold metric T and a smaller threshold dampening factor will permit longer run lengths that remove more original information, while, setting a lower threshold metric T and a higher threshold dampening factor D will tend to cut off extended run lengths sooner thereby keeping more original information. How much original information to remove at the expense of image quality is a design point that can vary from embodiment to embodiment.

For simplicity, the exemplary threshold metric value T that is chosen for the sake of the present discussion is 6.0 and the threshold dampening factor D is 6.0.

With the setting of the initial window parameters 101, the compression technique starts with the first pixel 111 and defines the window metrics 102 for the present (first) iteration of the window. For the first pixel 111, the iterative adjustment of the window metrics specifies a window size of W=1 (there is presently only one pixel in the window) and a threshold value of $Threshold_1=6$ (the threshold=T for the first iteration).

The compression technique then calculates the pixel value mean within the window 103. For the single, first pixel value 111, the calculated mean is simply the value of the first pixel itself (90).

The next pixel in the sequence 112 is then obtained 104 and compared against the calculated mean 104. If the next pixel is outside the just calculated mean by an amount that exceeds the threshold, the window is closed 105 and a next window is started 101. If the next pixel is the same as or outside the just calculated mean by an amount that is still within the threshold, the window is extended for a next iteration 102.

According to the example presently being discussed, the next pixel in the sequence 112 has a value of 91. With the threshold having a value of 6.0, the next pixel is within the threshold (i.e., the next pixel 112 is within a range of 90+/−6.0). As such, the window is extended 102 for a next iteration rather than being cut off.

The next iteration 102 adjusts the window size to $W_n=W_{n-1}+1=2$ (there are now 2 pixels in the window) and the threshold is reduced by an amount specified by the dampening factor. More specifically, the threshold value in the present embodiment can be determined as:

$$Threshold_n = Threshold_{n-1} - T/D \qquad \text{Eqn. 1}$$

Where $Threshold_{n-1}$ is the previous Threshold value. As such, for the second iteration (W=2), the threshold will be determined as $Threshold_1-(T/D)=6.0-(6.0/6.0)=6.0-1.0=5.0$.

Thus, according to Eqn. 1, with each iteration, the threshold becomes smaller making it less likely the window will be extended on the next iteration but nevertheless permitting the window to be extended so long as the next pixel value is sufficiently close to the mean of the pixels already within the window.

In this manner, large windows (long run lengths of pixels) are permitted for a string of pixels having comparable values, but otherwise new windows are started whenever a next pixel reveals a significant enough deviation from the established mean of prior pixels. Accordingly, this less complex mathematical approach nevertheless tends to easily get rid of large quantities of repetitive information but retains changes and deviations in the information. As such the size of the data footprint is suitably reduced but the overall picture quality is retained.

Continuing then with the example, the mean of the window is calculated 103. For the second iteration, the mean of the window is (90+91)/2=90.5.

The next pixel 113 has a value of 89 which is still within the threshold of 90.5+/−5.0. Therefore the window is extended for another pixel and corresponding iteration. The next iteration adjusts 102 the window size to $W_n=W_{n-1}+1=3$ (there are now 3 pixels in the window) and the threshold to a value of $Threshold_{n-1}-(T/D)=5.0-(6.0/6.0)=5.0-1.0=4.0$. The mean of the window is calculated 103. For the third iteration, the mean of the window is (90+91+89)/3=90.

The next pixel 114 has a value of 89 which is still within the threshold of 90+/−4.0. Therefore the window is extended for yet another pixel and corresponding iteration.

Inset 110 also tracks the corresponding mean pixel value, window size and threshold for each pixel. From inset 110 it is not until the seventh pixel 117 that the pixel value falls outside the prior established mean and threshold. As such, after the comparison of the seventh pixel value 117 against the prior established mean, the compression technique will close the window 105 and encode pixel values 111 through 116 with greatly reduced information that specifies six consecutive pixels are to each have the mean value of 89.8 (=90.0 when rounded to be specified with eight bits).

Moreover, a next window is newly opened 101 starting with the seventh pixel 117. The process then repeats as described above until the linear vector of pixel values reveals a next pixel that falls outside the next window's mean. Again, in an embodiment, the linear vector of pixel values may represent an entire row or entire column of a pixel array where, e.g., the pixel array is only for a specific color and multiple such pixel arrays for multiple colors are combined to form the entire image. Thus encoding of an entire image would include, e.g., performing the compression technique across each column or each row of each array for each color of the image.

Note that it would be difficult for window sizes to extend beyond seven pixel values given that the threshold metric is 6.0 and decrements by 1.0 every iteration. This characteristic, however, is an artifact of the values chosen for T and D. Other chosen values could create very different characteristics. Generally, however, T corresponds roughly to the maximum amount any pixel is permitted to be different than its neighbor without theoretically mandating the start of a new window. D corresponds to how much this maximum permissible threshold distance T drops with each new iteration for a continuing window.

In an embodiment where the processed images have the following characteristics: 360 dots per inch; cyan, magenta, yellow, and black, or only black, color planes; 256 pixel values implemented with halftones using four ink levels—T is set to a value of 12 and D is set to a value of 15. These T and D values were determined heuristically.

Note that the threshold calculating approach described above can be articulated more generally as:

$$Threshold = f(W) \qquad \text{Eqn. 2}$$

where f is any function that reduces in value as W increases. Although many embodiments of f(W) may decrease with each successive increase in W, Eqn. 2 is not intended to be that restrictive (e.g., some embodiments may keep f(W) constant for a few successive iterations before making a next reduction).

Likewise the discussion of the above example was particular to one specific embodiment. Other embodiments may also be implemented that extend or impose alternate sequences to this approach.

For example, according to a first alternative embodiment, the compression technique progresses as explained above except that that median is calculated for the window rather than the mean for comparison against the threshold. According a second alternative embodiment, the compression technique progresses as explained above except that the midpoint is calculated for the window rather than the mean for comparison against the threshold.

According to another alternative embodiment, rather than calculating the mean, median or midpoint on each iteration, instead, a comparison based on largest and smallest pixel values is used on each iteration. Specifically, the window is permitted to expand provided the difference between the largest and smallest pixels in the set of pixels within the window and the next pixel is less than the threshold. With each new pixel, a comparison is made between the new pixel and the largest and smallest pixels within the window. If the new pixel value is larger than the largest pixel value within the window, or, less than the smallest pixel value in the window, the new pixel value replaces the largest/smallest value as appropriate. If such a replacement transpires and causes the difference between the largest and smallest pixels to exceed the threshold for the current window size, the window is terminated. Even if no such replacement is made by a new pixel, a window can still terminate if the threshold falls to a level on a next iteration that is less than the difference of the previously existing largest and smallest pixel values within the window. When a window is terminated (the next pixel is not added to the window), the mean of the pixels within the window is determined and all such pixels are encoded with this mean value. A new window then begins. Note that this approach includes the new pixel value into a metric that is also determined from the previous pixel values and compares this metric against the threshold (rather than comparing the new pixel value against the metric and comparing to the threshold).

Note that all of the approaches discussed above can be restated in terms of the core functionality that establishes where in the pixel sequence a current window ends and a new window starts as comparing the threshold to a formulation that considers the new pixel value and the previous pixel values in order to "catch" a new pixel value that deviates from the window's previous pixel values to a degree that offends the current value of the threshold where the threshold diminishes with increasing window size. This can be described as a general formula where $T=f(W)$, and various versions of finding or limiting the threshold as a function of the window width W can be used.

Additionally, the median or midpoint or other formulation of pixel values within the window could be used as the encoding value for the pixels rather than the mean.

Additionally, once the threshold decays to a value of less than zero, the threshold instead may be set to zero and remain that way until the window is terminated.

Figure 2:
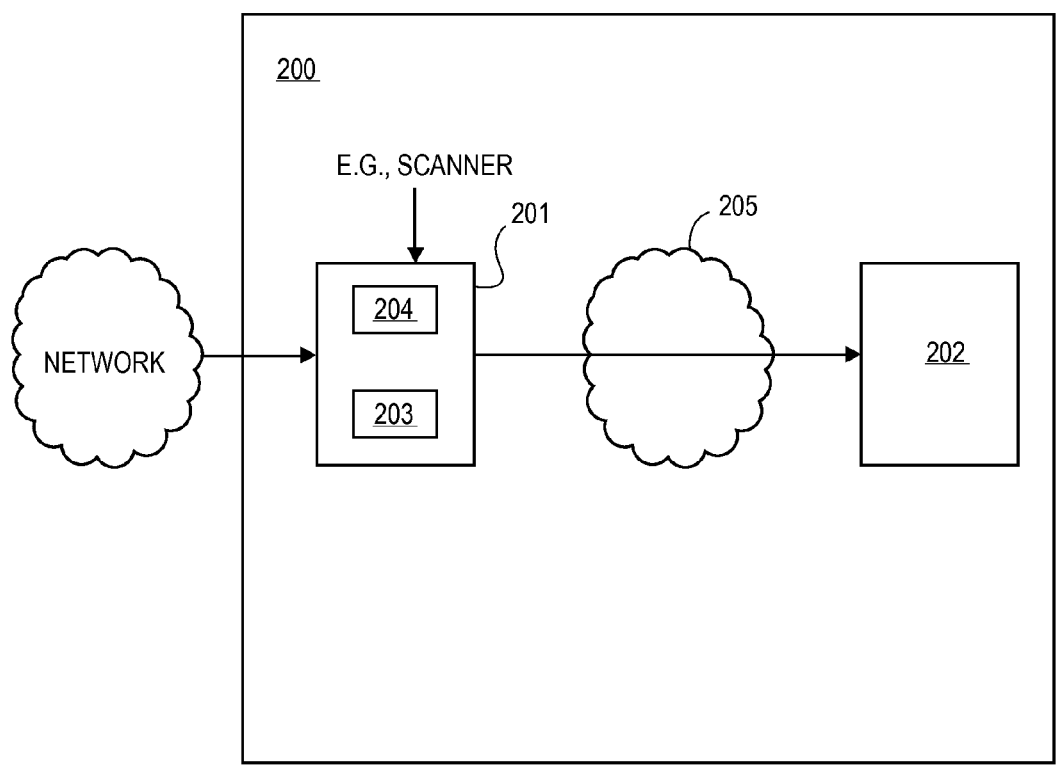
FIG. 2 depicts an exemplary printer.

FIG. 2 pertains to a high level depiction of a printer 200 that uses the compression technique of FIG. 1. As observed in FIG. 2 the printer is observed to have a digital front end 201 and a print engine 202. The print engine 202 may be implemented, for example, as an ink-jet mechanical assembly that is provided with image data and converts the same into a printed image on a piece of paper. Because of the mechanical nature (and even fluidic nature in the case of an ink-jet print engine) of the print engine 202 the print engine cannot perform its operations as quickly as an electronic system can process electronic signals. Thus a motivation for the compression technique is to provide less information for the print engine 202 to actually process when printing an image.

The digital front end 201 includes some kind of processing unit 203 (e.g., a micro-processor, an embedded processing core, a micro-controller, an embedded micro-controller, dedicated logic hardware, etc.) that is coupled to a memory 204 and executes program code instructions to implement the compression technique and/or performs the compression technique (or components thereof) in dedicated hardware. The digital front end 201 receives the uncompressed image from a network connection of some kind (e.g., wireless or wired) and stores the uncompressed image in memory 204. As discussed above, because the compression technique is not mathematically complex, the processing resources required to implement the compression technique can be relatively modest.

The processing unit 203 then executes the compression technique over the uncompressed image information to form the compressed, smaller footprint representation of the image which may, e.g., be stored back in memory 204.

The compressed version of the image is then sent over some form of communication network 205 (e.g., a link, a bus, etc.) to the print engine 202. Here, the compressed version of the image not only permits the print engine 202 to operate on less information yet still produce a quality image, but also conserves bandwidth resources of the network 205 between the digital front end 201 and the print engine 202. Thus the transportation of the image from the digital front end 201 to the print engine 202 imposes less of a burden on the communication apparatus between the digital front end 201 and the print engine 202.

Figure 3:
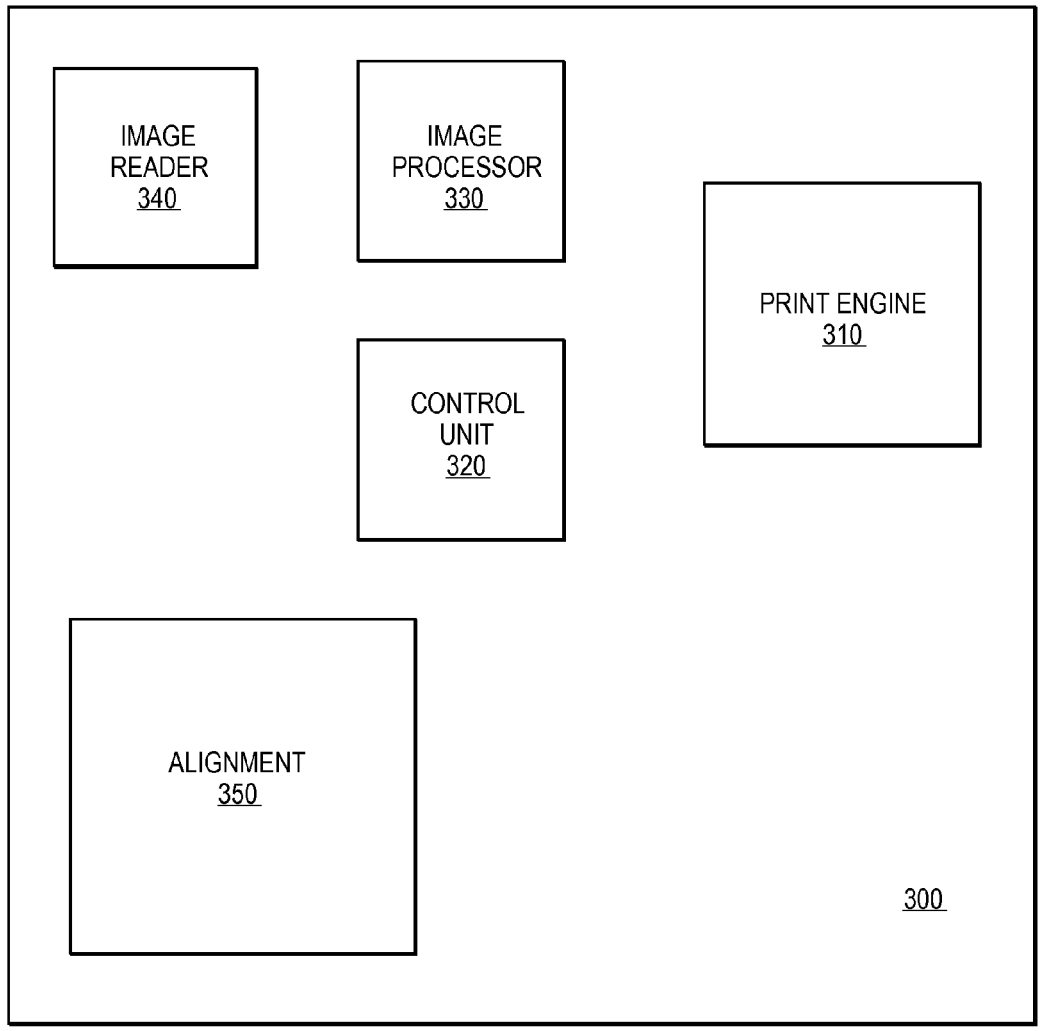
FIG. 3 depicts a more detailed exemplary printer.

FIG. 3 illustrates one embodiment of a printer 300. Printer 300 includes print engine 310, control unit 320, image processor 330, and image reader 340. Print engine 310 includes the print heads that apply ink to a print medium (e.g., paper). In one embodiment, print engine 310 includes at least four print heads arranged in a fixed inkjet print head array. In a further embodiment, print heads associated with a single color are located within the same print head tray. The scaling processes described above may, in various embodiments, be implemented by any of the control unit 320 or image processor 330. The control unit 320 and/or image processor 330 may be implemented, wholly or partially, as a processor or other kind of circuit that executes program code. The control unit 320 and/or the image processor 330 may correspond to the digital front end discussed above with respect to FIG. 2.

Control unit 320 controls the operation of print engine 310, while image processor 330 performs rasterization of image data received at printer 300. Rasterization converts information received at printer 300 into a raster format. Particularly, image processor 330 generates a raster scan of a received image that is to be stored as scan line data in a memory array. Subsequently, image processor 330 performs halftone processing of the scan line data stored in the memory array. Control unit 320 also verifies the output of print engine 310 upon receiving image data captured by image reader 340.

Printer 300 also includes a print head alignment system 350. Alignment system 350 is implemented to provide an alignment of print engine 310 associated with each individual ink color with respect to a reference position. In a further embodiment, alignment system 350 provides a framework for computing a magnitude of misalignment between print heads in fixed print head array arrangements. Although shown as residing a component of printer 300, other embodiments may feature alignment system 350 as an independent device, or combination of devices, that is communicably coupled to printer 300. Various fixes to problems exhibited by the aforementioned printouts my be addressed via manipulation of the alignment system 350.

Figure 4:
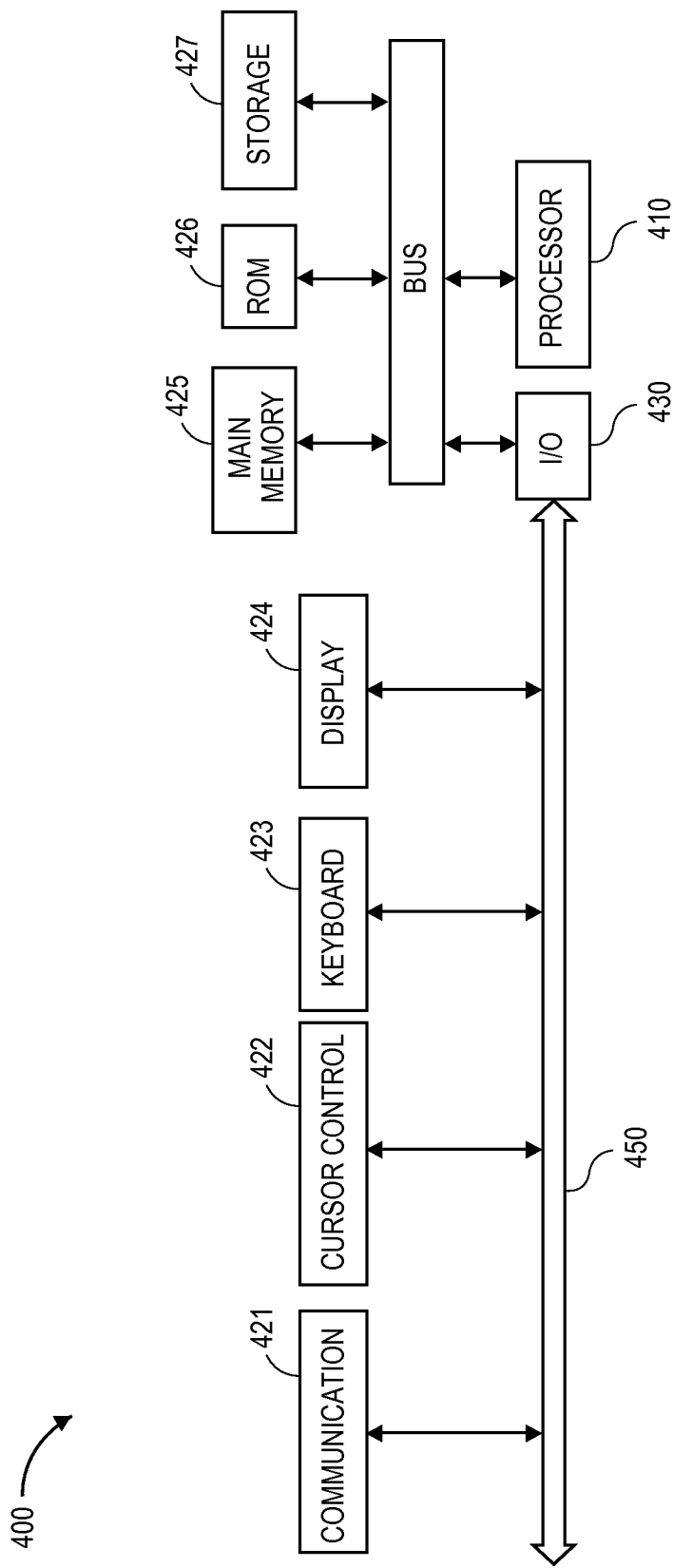
FIG. 4 depicts a computing system.

Control unit 320 may be implemented as a form of computing system having a central processing unit and associated system memory and non volatile storage. An exemplary computing system is depicted in FIG. 4. Control unit 320 may include various components of the computing system of FIG. 4.

FIG. 4 illustrates a computer system 400. Computer system 400 may partially or wholly found within, for example, either or both of control unit 320 and image processor 330 of FIG. 3. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions. Program code may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

The invention claimed is:

1. A computer generated method, comprising:
    a processor defining a window of one or more consecutive pixel values in a linear array of pixel values of an image, the defining including adding a pixel value in the linear array to the window so long as the pixel value does not deviate from the pixel values that exist within the window to a degree that causes a threshold value to be exceeded, and, wherein the threshold value decreases as $T_W/D$ as the size of the window increases, where $T_W$ is the threshold for the Wth pixel of a window, D is a dampening factor and W is the size of the window in pixels;
    encoding the window of pixel values with a value determined from pixel values within the window and the number of pixel values within the window.

2. The method of claim 1 further comprising transmitting the encoded window of pixel values to a print engine within a printer and performing the defining and encoding within the printer.

3. The method of claim 1 wherein the threshold is exceeded by:
    the added pixel value falling outside the mean of the pixel values within the window plus or minus the threshold.

4. A non-transitory machine readable medium contains instructions that when processed by a processing unit cause the processing unit to perform a method, comprising:
    defining a window of one or more consecutive pixel values in a linear array of pixel values of an image, the defining including adding a pixel value in the linear array to the window so long as the pixel value does not deviate from the pixel values that exist within the window to a degree that causes a threshold value to be exceeded, and, wherein the threshold value decreases as $T_W/D$ as the size of the window increases, where $T_W$ is the threshold for the Wth pixel of a window, D is a dampening factor and W is the size of the window in pixels;
    encoding the window of pixel values with a value determined from pixel values within the window and the number of pixel values within the window.

5. The machine readable medium of claim 4 wherein the method further comprises causing the transmission of the encoded window of pixel values to a print engine within a printer.

6. The machine readable medium of claim 5 wherein the method further comprises performing the defining and encoding within the printer.

7. The machine readable medium of claim 4 wherein the threshold is exceeded by:
    the added pixel value falling outside the mean of the pixel values within the window plus or minus the threshold.

8. The machine readable medium of claim 4 wherein the threshold is exceeded by:
    the added pixel value falling outside the median of the pixel values within the window plus or minus the threshold.

9. The machine readable medium of claim 4 wherein the threshold is exceeded by:
    the added pixel value falling outside the midpoint of the pixel values within the window plus or minus the threshold.

10. The machine readable medium of claim 4 wherein the threshold is exceeded by:
    the difference between the largest pixel value and the smallest pixel value, when considering the added pixel value and the pixel values within the window.

11. A printer comprising:
    A processing unit; and
    a storage medium containing machine executable instructions that when processed by the processing unit within the printer cause the printer to defining a window of one or more consecutive pixel values in a linear array of pixel values of an image, the defining including adding a pixel value in the linear array to the window so long as the pixel value does not deviate from the pixel values that exist within the window to a degree that causes a threshold value to be exceeded, and, wherein the threshold value decreases as $T_W/D$ as the size of the window increases, where $T_W$ is the threshold for the $W^{th}$ pixel of a window, D is a dampening factor and W is the size of the window in pixels;

encoding the window of pixel values with a value determined from pixel values within the window and the number of pixel values within the window.

12. The printer of claim 11 wherein the method further comprises causing the transmission of the encoded window of pixel values to a print engine within a printer.

13. The printer of claim 12 wherein the method further comprises performing the defining and encoding within the printer.

14. The printer of claim 11 wherein the threshold is exceeded by:

the added pixel value falling outside the mean of the pixel values within the window plus or minus the threshold.

15. The machine readable medium of claim 11 wherein the threshold is exceeded by:

the added pixel value falling outside the median of the pixel values within the window plus or minus the threshold.

16. The printer of claim 11 wherein the threshold is exceeded by:

the added pixel value falling outside the midpoint of the pixel values within the window plus or minus the threshold.

17. The printer of claim 11 wherein the threshold is exceeded by:

the difference between the largest pixel value and the smallest pixel value, when considering the added pixel value and the pixel values within the window.

* * * * *